United States Patent
Ahmed et al.

(10) Patent No.: US 12,196,835 B2
(45) Date of Patent: Jan. 14, 2025

(54) SYSTEMS AND METHODS FOR AUTOMATIC TRIGGERING OF RANGING

(71) Applicant: Meta Platforms Technologies, LLC, Menlo Park, CA (US)

(72) Inventors: Nabeel Ahmed, San Jose, CA (US); Sam Padinjaremannil Alex, Dublin, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 387 days.

(21) Appl. No.: 17/565,756

(22) Filed: Dec. 30, 2021

(65) Prior Publication Data

US 2022/0299617 A1 Sep. 22, 2022

Related U.S. Application Data

(60) Provisional application No. 63/163,418, filed on Mar. 19, 2021, provisional application No. 63/163,415, (Continued)

(51) Int. Cl.
*G01S 11/02* (2010.01)
*H04L 69/22* (2022.01)
(Continued)

(52) U.S. Cl.
CPC .............. *G01S 11/02* (2013.01); *H04L 69/22* (2013.01); *H04W 4/023* (2013.01); (Continued)

(58) Field of Classification Search
CPC .......................... G01C 21/1654; H04B 1/7163
See application file for complete search history.

(56) References Cited

U.S. PATENT DOCUMENTS 8,593,573 B2 11/2013 Price et al.
10,064,038 B2 8/2018 Kulavik et al.
(Continued)

FOREIGN PATENT DOCUMENTS

EP 1560344 A1 8/2005
EP 2031418 A1 3/2009
(Continued)

OTHER PUBLICATIONS

Alanwar A., et al., "SeleCon: Scalable IoT Device Selection and Control Using Hand Gestures," IEEE/ACM Second International Conference on Internet-of-Things Design and Implementation (IoTDI), Apr. 18, 2017, pp. 47-58.
(Continued)

*Primary Examiner* — Bernarr E Gregory
(74) *Attorney, Agent, or Firm* — Foley & Lardner LLP

(57) ABSTRACT

In one aspect, the systems and methods may automatically trigger ranging include a device which may establish a connection between a first device comprising a first ultra-wideband (UWB) antenna and a second device having a second UWB antenna. The device may receive from one or more motion sensors of the first device, motion data of the first device during an inactive ranging phase. The device may determine to switch from the inactive ranging phase to an active ranging phase responsive to the motion data indicating motion of the first device satisfying a threshold criteria. The device may perform a first ranging operation between the first device and the second device using the first UWB antenna of the first device and the second UWB antenna of the second device, responsive to switching from the inactive ranging phase to the active ranging phase.

20 Claims, 7 Drawing Sheets

Related U.S. Application Data filed on Mar. 19, 2021, provisional application No. 63/163,403, filed on Mar. 19, 2021, provisional application No. 63/163,409, filed on Mar. 19, 2021.

(51) Int. Cl.

| | | |
|---|---|---|
| *H04W 4/02* | (2018.01) | |
| *H04W 28/02* | (2009.01) | |
| *H04W 28/22* | (2009.01) | |
| *H04W 72/044* | (2023.01) | |
| *H04W 72/20* | (2023.01) | |
| *H04W 72/541* | (2023.01) | |
| *H04W 72/542* | (2023.01) | |
| *H04W 76/14* | (2018.01) | |

(52) U.S. Cl.
CPC ... *H04W 28/0236* (2013.01); *H04W 28/0247* (2013.01); *H04W 28/22* (2013.01); *H04W 72/0473* (2013.01); *H04W 72/20* (2023.01); *H04W 72/541* (2023.01); *H04W 72/542* (2023.01); *H04W 76/14* (2018.02)

(56) References Cited

U.S. PATENT DOCUMENTS

| | | |
|---|---|---|
| 10,721,571 B2 | 7/2020 | Crow et al. |
| 11,470,444 B2 | 10/2022 | Burowski et al. |
| 11,516,337 B2 | 11/2022 | Ledvina et al. |
| 11,520,550 B1 | 12/2022 | Bushnell et al. |
| 11,588,722 B2 | 2/2023 | Costa-Requena |
| 2004/0028011 A1 | 2/2004 | Gehring et al. |
| 2004/0156512 A1 | 8/2004 | Parker |
| 2005/0041746 A1 | 2/2005 | Rosen et al. |
| 2006/0171445 A1 | 8/2006 | Batra et al. |
| 2007/0053412 A1* | 3/2007 | Hashimoto .......... H04B 1/7163 375/130 |
| 2007/0073482 A1* | 3/2007 | Churchill .......... G01C 21/1654 701/492 |
| 2007/0105501 A1 | 5/2007 | Shen et al. |
| 2007/0201393 A1 | 8/2007 | Srikrishna et al. |
| 2007/0234186 A1 | 10/2007 | Mo et al. |
| 2008/0130766 A1 | 6/2008 | Li et al. |
| 2008/0220742 A1 | 9/2008 | Maheshwari et al. |
| 2010/0272151 A1 | 10/2010 | Nandagopalan et al. |
| 2010/0273505 A1 | 10/2010 | Moller et al. |
| 2011/0178863 A1 | 7/2011 | Daigle |
| 2013/0139242 A1 | 5/2013 | Zhu |
| 2014/0016536 A1 | 1/2014 | Zhu |
| 2014/0169162 A1 | 6/2014 | Romano et al. |
| 2015/0153443 A1 | 6/2015 | Van Taunay |
| 2015/0180757 A1 | 6/2015 | Oshiba |
| 2016/0232728 A1 | 8/2016 | Allibhoy et al. |
| 2016/0360497 A1 | 12/2016 | Maruyama et al. |
| 2020/0068308 A1 | 2/2020 | Hosoi et al. |
| 2020/0313999 A1 | 10/2020 | Lee et al. |
| 2020/0382158 A1 | 12/2020 | Yang et al. |
| 2021/0014677 A1 | 1/2021 | Han et al. |
| 2021/0072373 A1 | 3/2021 | Schoenberg et al. |
| 2021/0160613 A1 | 5/2021 | Gigandet et al. |
| 2021/0176230 A1 | 6/2021 | Cho et al. |
| 2021/0360366 A1 | 11/2021 | Bailey et al. |
| 2022/0264251 A1 | 8/2022 | Wang et al. |
| 2022/0377018 A1 | 11/2022 | Kitahara et al. |

FOREIGN PATENT DOCUMENTS

| | | |
|---|---|---|
| WO | 2015144293 A2 | 10/2015 |
| WO | 2020214708 A1 | 10/2020 |
| WO | 2021023377 A1 | 2/2021 |

OTHER PUBLICATIONS

"IEEE Standard for Low-Rate Wireless Networks—Amendment 1: Enhanced Ultra Wideband (UWB) Physical Layers (PHYs) and Associated Ranging Techniques; IEEE Std 802.15.4z-2020 (Amendment to IEEE Std 802.15.4-2020)," IEEE Standard, Aug. 25, 2020 (Aug. 25, 2020), pp. 1-174, XP068170639, DOI: 10.1109/IEEESTD.2020.9179124, Retrieved from the Internet: URL: https://ieeexplore.ieee.org/document/9179124, [retrieved on Aug. 31, 2020].

International Search Report and Written Opinion for International Application No. PCT/US2022/020233 mailed Aug. 11, 2022, 19 pages.

International Search Report and Written Opinion for International Application No. PCT/US2022/020449 mailed Jun. 21, 2022, 13 pages.

International Search Report and Written Opinion for International Application No. PCT/US2022/020563, mailed Jul. 8, 2022, 12 pages.

International Search Report and Written Opinion for International Application No. PCT/US2022/020630, mailed Aug. 10, 2022, 16 pages.

\* cited by examiner

SYSTEMS AND METHODS FOR AUTOMATIC TRIGGERING OF RANGING

CROSS-REFERENCE TO RELATED APPLICATIONS

This application claims priority to and the benefit of U.S. Provisional Application No. 63/163,418, filed Mar. 19, 2021, U.S. Provisional Application No. 63/163,415, filed Mar. 19, 2021, U.S. Provisional Application No. 63/163,409, filed Mar. 19, 2021, and U.S. Provisional Application No. 63/163,403, filed Mar. 19, 2021, each of which is incorporated herein by reference in its entirety for all purposes.

FIELD OF DISCLOSURE

This application is directed to systems and methods for managing operations of ultra-wideband (UWB) devices, including but not limited to systems and methods for triggering or initiating ranging operations.

BACKGROUND

Artificial reality such as virtual reality (VR), augmented reality (AR), or mixed reality (MR) provides immersive experience to a user. Typically, in systems and methods which implement or otherwise provide immersive experiences, such systems utilize Wi-Fi, Bluetooth, or Radio wireless links to transmit/receive data. However, using such wireless links typically requires detailed coordination between links, particularly where multiple devices in the same environment are utilizing the same wireless link technology for communications.

SUMMARY

In one aspect, this disclosure is directed to a method. The method includes establishing, by a first device comprising a first ultra-wideband (UWB) antenna, a connection with a second device having a second UWB antenna. The method includes receiving, by the first device from one or more motion sensors of the first device, motion data of the first device during an inactive ranging phase. The method includes determining, by the first device, to switch from the inactive ranging phase to an active ranging phase responsive to the motion data indicating motion of the first device satisfying a threshold criteria. The method includes performing, by the first device, a first ranging operation between the first device and the second device using the first UWB antenna of the first device and the second UWB antenna of the second device, responsive to switching from the inactive ranging phase to the active ranging phase.

In some embodiments, the motion data includes a velocity vector of the first device. Determining to switch from the inactive ranging phase to the active ranging phase may include determining, by the first device, to switch from the inactive ranging phase to the active ranging phase responsive to the velocity vector being greater than or equal to the threshold criteria. In some embodiments, the method further includes, responsive to performing the first ranging operation: receiving, by the first device from the one or more motion sensors, second motion data during the active ranging phrase; determining, by the first device, to switch from the active ranging phase to the inactive ranging phase responsive to the motion data indicating motion of the first device not satisfying the threshold criteria; and switching, by the first device responsive to the determination, from the active ranging phase to the inactive ranging phase. In some embodiments, the method further includes performing, by the first device, one or more second ranging operations at a reduced frequency in the inactive ranging phase relative to ranging operations in the active ranging phase. In some embodiments, switching from the active ranging phase to the inactive ranging phase comprises avoiding performing, by the first device, one or more second ranging operations in the inactive UWB phase.

In some embodiments, establishing the connection comprises performing, by the first device, a handshake protocol with the second device, and establishing, by the first device, the connection according to the handshake protocol. In some embodiments, the method further includes pairing, by the first device, with the second device responsive to receiving the motion data. In some embodiments, the method further includes determining, by the first device, an orientation of the first device relative to the second device, based on one or more second ranging operations between the first UWB antenna of the first device and the second UWB antenna of the second device, responsive to establishing the connection, wherein the one or more second ranging operations are prior to the one or more first ranging operations. In some embodiments, receiving the motion data comprises receiving, by the first device, motion data of the first device relative to motion data of the second device during the inactive ranging phase.

In another aspect, this disclosure is directed to a device. The device includes a first ultra-wideband (UWB) antenna. The device includes one or more processors configured to establish a connection with a second device having a second UWB antenna. The one or more processors are configured to receive, from one or more motion sensors of the first device, motion data of the first device during an inactive ranging phase. The one or more processors are configured to determine to switch from the inactive ranging phase to an active ranging phase responsive to the motion data indicating motion of the first device satisfying a threshold criteria. The one or more processors are configured to perform a first ranging operation between the first device and the second device using the first UWB antenna of the first device and the second UWB antenna of the second device, responsive to switching from the inactive ranging phase to the active ranging phase.

In some embodiments, the motion data includes a velocity vector of the first device. Determining to switch from the inactive ranging phase to the active ranging phase may be responsive to the velocity vector being greater than or equal to the threshold criteria. In some embodiments, the one or more processors are further configured to, responsive to performing the first ranging operation: receive, from the one or more motion sensors, second motion data during the active ranging phrase; determine to switch from the active ranging phase to the inactive ranging phase responsive to the motion data indicating motion of the first device not satisfying the threshold criteria; and switch, responsive to the determination, from the active ranging phase to the inactive ranging phase. In some embodiments, the one or more processors are further configured to perform one or more second ranging operations at a reduced frequency in the inactive ranging phase relative to ranging operations in the active ranging phase. In some embodiments, the one or more processors are further configured to avoid performing one or more second ranging operations in the inactive UWB phase.

In some embodiments, to establish the connection, the one or more processors are configured to perform a handshake protocol with the second device, and establish the connection according to the handshake protocol. In some embodiments, the one or more processors are further configured to pair with the second device responsive to receiving the motion data. In some embodiments, the one or more processors are further configured to determine an orientation of the first device relative to the second device, based on one or more second ranging operations between the first UWB antenna of the first device and the second UWB antenna of the second device, responsive to establishing the connection, wherein the one or more second ranging operations are prior to the one or more first ranging operations. In some embodiments, the one or more processors are further configured to receive the motion data of the first device relative to motion data of the second device during the inactive ranging phase.

In yet another aspect, this disclosure is directed to a non-transitory computer readable medium storing instructions that, when executed by one or more processors, cause the one or more processors to establish a connection between a first device comprising a first ultra-wideband (UWB) antenna and a second device having a second UWB antenna. The instructions further cause the one or more processors to receive from one or more motion sensors of the first device, motion data of the first device during an inactive ranging phase. The instructions further cause the one or more processors to determine to switch from the inactive ranging phase to an active ranging phase responsive to the motion data indicating motion of the first device satisfying a threshold criteria. The instructions further cause the one or more processors to perform a first ranging operation between the first device and the second device using the first UWB antenna of the first device and the second UWB antenna of the second device, responsive to switching from the inactive ranging phase to the active ranging phase.

In some embodiments, the instructions further cause the one or more processors to: responsive to performing the first ranging operation: receive, from the one or more motion sensors, second motion data during the active ranging phrase; determine to switch from the active ranging phase to the inactive ranging phase responsive to the motion data indicating motion of the first device not satisfying the threshold criteria; and switch, responsive to the determination, from the active ranging phase to the inactive ranging phase.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
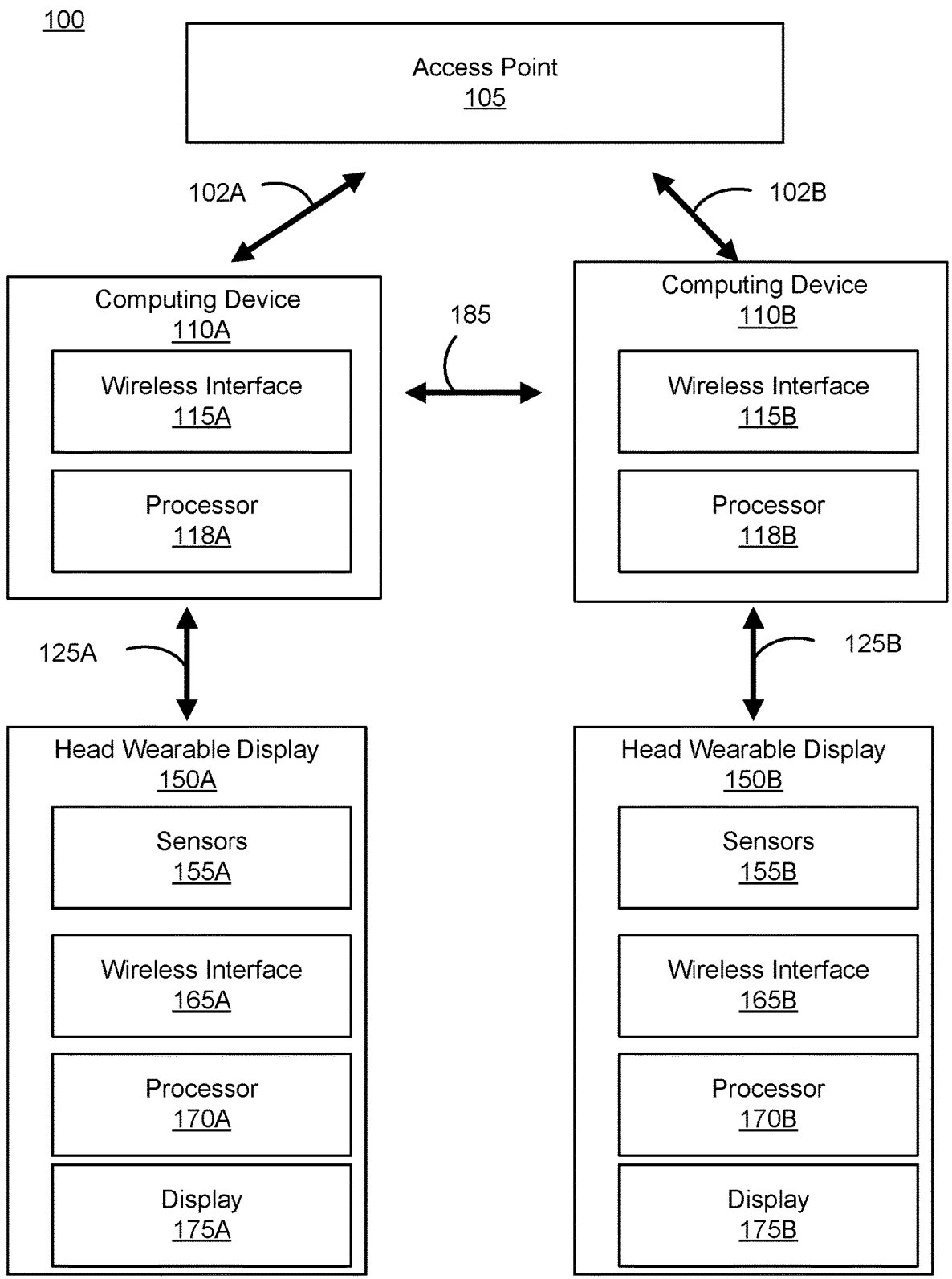
FIG. 1 is a diagram of a system environment including an artificial reality system, according to an example implementation of the present disclosure.
Figure 2:
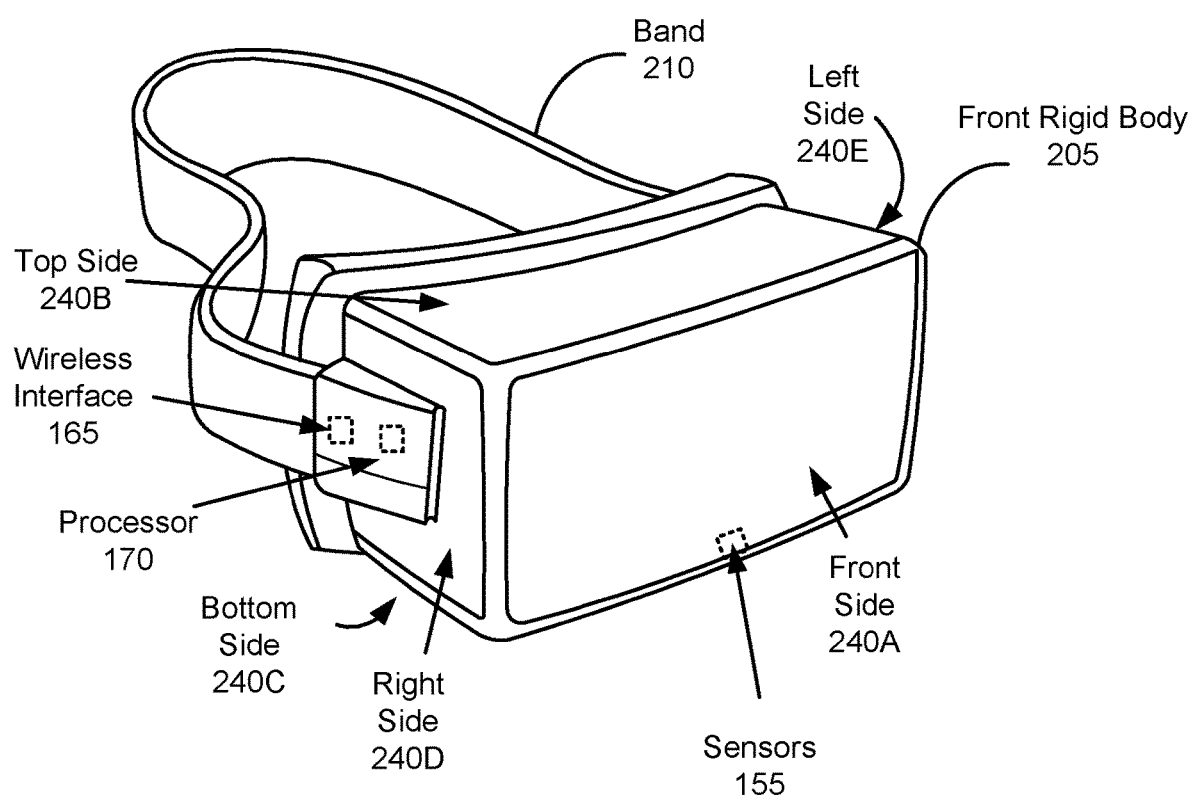
FIG. 2 is a diagram of a head wearable display, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are embodiments related to devices operating in the ultra-wideband (UWB) spectrum. In various embodiments, UWB devices operate in the 3-10 GHz unlicensed spectrum using 500+ MHz channels which may require low power for transmission. For example, the transmit power spectral density (PSD) for some devices may be limited to −41.3 dBm/MHz. On the other hand, UWB may have transmit PSD values in the range of −5 to +5 dBm/MHz range, averaged over 1 ms, with a peak power limit of 0 dBm in a given 50 MHz band. Using simple modulation and spread spectrum, UWB devices may achieve reasonable resistance to Wi-Fi and Bluetooth interference (as well as resistance to interference with other UWB devices within a shared or common environment) for very low data rates (e.g., 10 s to 100 s Kbps) and may have large processing gains. However, for higher data rates (e.g., several Mbps), the processing gains may not be sufficient to overcome co-channel interference from Wi-Fi or Bluetooth. According to the embodiments described herein, the systems and methods described herein may operate in frequency bands that do not overlap with Wi-Fi and Bluetooth, but may have good global availability based on regulatory requirements. Since regulatory requirements make the 7-8 GHz spectrum the most widely available globally (and Wi-Fi is not present in this spectrum), the 7-8 GHz spectrum may operate satisfactory both based on co-channel interference and processing gains.

Some implementations of UWB may focus on precision ranging, security, and low to moderate rate data communication. As UWB employs relatively simple modulation, it may be implemented at low cost and low power consumption. In AR/VR applications, link budget calculations for an AR/VR controller link indicate that the systems and methods described herein may be configured for effective data throughput ranging from ~2 to 31 Mbps (e.g., with 31 Mbps being the maximum possible rate in the latest 802.15.4z standard), which may depend on body loss assumptions. Using conservative body loss assumptions, the systems and methods described herein should be configured for data throughput of up to approximately 5 Mbps, which may be sufficient to meet the data throughput performance standards for AR/VR links. With a customized implementation, data throughput rate could be increased beyond 27 Mbps (e.g., to 54 Mbps), but with possible loss in link margin.

The systems and methods described herein may be used or leveraged in various AR/VR use cases and applications. The systems and methods described herein may be used for data communication and ranging within AR/VR products, as well as seamless communication within an ecosystem or environment of devices or components. For example, the systems and methods described herein may be used for secure transfer of user context between devices (e.g., audio/video calls, live video chat sessions, etc.), synchronization of data between devices (e.g., contact list, to-do list, photos, etc.), synchronization of health data between devices for sports applications (e.g., health statistics from a wearable device sent to a video capture and communication device), transfer of telemetry and inertial measurement unit data for offline analysis (e.g., for use in various artificial intelligence applications to make recommendations, such as places to go, for a more personalized experience), and interoperability applications between devices (e.g., using a wearable device or video capture device remote as an "air" mouse to communicate with other devices, such as a head-wearable device (HWD)). The systems and methods described herein may leverage UWB for such communication and synchronization, which may result in low power, cost, and latency, increased security by way of enhanced precision ranging (including distance and angle determination), capability of high data throughput in low tens of Mbps, and may be resistant to interference with other wireless links (such as those provided by Wi-Fi and Bluetooth).

Additional applications and use cases for the present systems and methods may include use cases relating to AR/VR devices, use cases relating to video capture devices, internet-of-things (IoT) or smart devices, headphones, and the like. For example, with respect to AR/VR devices, the systems and methods described herein may incorporate UWB devices (in place of Wi-Fi, radio frequency, or Bluetooth device(s)), which may be used for data communication for both link data transfer and inertial measurement unit data transfer. In such implementations, the AR/VR devices may have an increased data throughput rate on a per-controller basis, as well as increased data throughput rates for broadcast data (such as broadcasted map data). Additionally, the AR/VR devices may resolve any co-existence problems relating to radio frequency, Bluetooth (and Bluetooth low energy), Wi-Fi, and Bluetooth headphones. Furthermore, the AR/VR devices may have low latency in comparison to other implementations and embodiments, and may be less costly by eliminating hardware (such as Wi-Fi chips) from the AR/VR controller. As another example, with respect to use cases relating to video capture devices, the systems and methods described herein may include UWB devices for ranging and data communication for a remote control in communication with the video capture device. Such implementations and embodiments may provide for two-way ranging (TWR) for distance and angle of approach (AOA) determination, may provide for determining whether the remote control is located "in-room" for securely controlling a video capture device, and may add distance to the operable range of the remote control for an improved air mouse. With respect to Internet-of-Things (IoT) or smart devices, the systems and methods described herein may include UWB devices for implementing a digital key (e.g., for a home or automobile). Such implementations and embodiments may provide for automatic unlocking a home or automobile (e.g., via secure link) as a user approaches. With respect to headphones, the systems and methods described herein may include UWB devices for VR/Smart glasses, wearable devices, custom headphones, video capture devices to decrease latency in audio communications. Various applications, use cases, and further implementations of the systems and methods described herein are described in greater detail below.

FIG. 1 is a block diagram of an example artificial reality system environment 100. In some embodiments, the artificial reality system environment 100 includes an access point (AP) 105, one or more HWDs 150 (e.g., HWD 150A, 150B), and one or more computing devices 110 (computing devices 110A, 110B; sometimes referred to as consoles) providing data for artificial reality to the one or more HWDs 150. The access point 105 may be a router or any network device allowing one or more computing devices 110 and/or one or more HWDs 150 to access a network (e.g., the Internet). The access point 105 may be replaced by any communication device (cell site). A computing device 110 may be a custom device or a mobile device that can retrieve content from the access point 105, and provide image data of artificial reality to a corresponding HWD 150. Each HWD 150 may present the image of the artificial reality to a user according to the image data. In some embodiments, the artificial reality system environment 100 includes more, fewer, or different components than shown in FIG. 1. In some embodiments, the computing devices 110A, 110B communicate with the access point 105 through wireless links 102A, 102B (e.g., interlinks), respectively. In some embodiments, the computing device 110A communicates with the HWD 150A through a wireless link 125A (e.g., intralink), and the computing device 110B communicates with the HWD 150B through a wireless link 125B (e.g., intralink). In some embodiments, functionality of one or more components of the artificial reality system environment 100 can be distributed among the components in a different manner than is described here. For example, some of the functionality of the computing device 110 may be performed by the HWD 150. For example, some of the functionality of the HWD 150 may be performed by the computing device 110.

In some embodiments, the HWD 150 is an electronic component that can be worn by a user and can present or provide an artificial reality experience to the user. The HWD 150 may be referred to as, include, or be part of a head mounted display (HMD), head mounted device (HMD), head wearable device (HWD), head worn display (HWD) or head worn device (HWD). The HWD 150 may render one or more images, video, audio, or some combination thereof to provide the artificial reality experience to the user. In some embodiments, audio is presented via an external device (e.g., speakers and/or headphones) that receives audio information from the HWD 150, the computing device 110, or both, and presents audio based on the audio information. In some embodiments, the HWD 150 includes sensors 155, a wireless interface 165, a processor 170, and a display 175. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detects a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the wireless interface 165 includes an electronic component or a combination of an electronic component and a software component that communicates with the computing device 110. In some embodiments, the wireless interface 165 includes or is embodied as a transceiver for transmitting and receiving data through a wireless medium. The wireless interface 165 may communicate with a wireless interface 115 of a corresponding computing device 110 through a wireless link 125 (e.g., intralink). The wireless interface 165 may also communicate with the access point 105 through a wireless link (e.g., interlink). Examples of the wireless link 125 include a near field communication link, Wi-Fi direct, Bluetooth, or any wireless communication link. In some embodiments, the wireless link 125 may include one or more ultra-wideband communication links, as described in greater detail below. Through the wireless link 125, the wireless interface 165 may transmit to the computing device 110 data indicating the determined location and/or orientation of the HWD 150, the determined gaze direction of the user, and/or hand tracking measurement. Moreover, through the wireless link 125, the wireless interface 165 may receive from the computing device 110 image data indicating or corresponding to an image to be rendered.

In some embodiments, the processor 170 includes an electronic component or a combination of an electronic component and a software component that generates one or more images for display, for example, according to a change in view of the space of the artificial reality. In some embodiments, the processor 170 is implemented as one or more graphical processing units (GPUs), one or more central processing unit (CPUs), or a combination of them that can execute instructions to perform various functions described herein. The processor 170 may receive, through the wireless interface 165, image data describing an image of artificial reality to be rendered, and render the image through the display 175. In some embodiments, the image data from the computing device 110 may be encoded, and the processor 170 may decode the image data to render the image. In some embodiments, the processor 170 receives, from the computing device 110 through the wireless interface 165, object information indicating virtual objects in the artificial reality space and depth information indicating depth (or distances from the HWD 150) of the virtual objects. In one aspect, according to the image of the artificial reality, object information, depth information from the computing device 110, and/or updated sensor measurements from the sensors 155, the processor 170 may perform shading, reprojection, and/or blending to update the image of the artificial reality to correspond to the updated location and/or orientation of the HWD 150.

In some embodiments, the display 175 is an electronic component that displays an image. The display 175 may, for example, be a liquid crystal display or an organic light emitting diode display. The display 175 may be a transparent display that allows the user to see through. In some embodiments, when the HWD 150 is worn by a user, the display 175 is located proximate (e.g., less than 3 inches) to the user's eyes. In one aspect, the display 175 emits or projects light towards the user's eyes according to image generated by the processor 170. The HWD 150 may include a lens that allows the user to see the display 175 in a close proximity.

In some embodiments, the processor 170 performs compensation to compensate for any distortions or aberrations. In one aspect, the lens introduces optical aberrations such as a chromatic aberration, a pin-cushion distortion, barrel distortion, etc. The processor 170 may determine a compensation (e.g., predistortion) to apply to the image to be rendered to compensate for the distortions caused by the lens, and apply the determined compensation to the image from the processor 170. The processor 170 may provide the predistorted image to the display 175.

In some embodiments, the computing device 110 is an electronic component or a combination of an electronic component and a software component that provides content to be rendered to the HWD 150. The computing device 110 may be embodied as a mobile device (e.g., smart phone, tablet PC, laptop, etc.). The computing device 110 may operate as a soft access point. In one aspect, the computing device 110 includes a wireless interface 115 and a processor 118. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. The computing device 110 may also communicate with the access point 105, and may obtain AR/VR content from the access point 105, for example, through the wireless link 102 (e.g., interlink). The computing device 110 may receive sensor measurement indicating location and the gaze direction of the user of the HWD 150 and provide the image data to the HWD 150 for presentation of the artificial reality, for example, through the wireless link 125 (e.g., intralink). In other embodiments, the computing device 110 includes more, fewer, or different components than shown in FIG. 1.

In some embodiments, the wireless interface 115 is an electronic component or a combination of an electronic component and a software component that communicates with the HWD 150, the access point 105, other computing device 110, or any combination of them. In some embodiments, the wireless interface 115 includes or is embodied as a transceiver for transmitting and receiving data through a wireless medium. The wireless interface 115 may be a counterpart component to the wireless interface 165 to communicate with the HWD 150 through a wireless link 125 (e.g., intralink). The wireless interface 115 may also include a component to communicate with the access point 105 through a wireless link 102 (e.g., interlink). Examples of wireless link 102 include a cellular communication link, a near field communication link, Wi-Fi, Bluetooth, 60 GHz wireless link, ultra-wideband link, or any wireless communication link. The wireless interface 115 may also include a component to communicate with a different computing device 110 through a wireless link 185. Examples of the wireless link 185 include a near field communication link, Wi-Fi direct, Bluetooth, ultra-wideband link, or any wireless communication link. Through the wireless link 102 (e.g., interlink), the wireless interface 115 may obtain AR/VR content, or other content from the access point 105. Through the wireless link 125 (e.g., intralink), the wireless interface 115 may receive from the HWD 150 data indicating the determined location and/or orientation of the HWD 150, the determined gaze direction of the user, and/or the hand tracking measurement. Moreover, through the wireless link 125 (e.g., intralink), the wireless interface 115 may transmit to the HWD 150 image data describing an image to be rendered. Through the wireless link 185, the wireless interface 115 may receive or transmit information indicating the wireless link 125 (e.g., channel, timing) between the computing device 110 and the HWD 150. According to the information indicating the wireless link 125, computing devices 110 may coordinate or schedule operations to avoid interference or collisions.

The processor 118 can include or correspond to a component that generates content to be rendered according to the location and/or orientation of the HWD 150. In some embodiments, the processor 118 includes or is embodied as one or more central processing units, graphics processing units, image processors, or any processors for generating images of the artificial reality. In some embodiments, the processor 118 may incorporate the gaze direction of the user of the HWD 150 and a user interaction in the artificial reality to generate the content to be rendered. In one aspect, the processor 118 determines a view of the artificial reality according to the location and/or orientation of the HWD 150. For example, the processor 118 maps the location of the HWD 150 in a physical space to a location within an artificial reality space, and determines a view of the artificial reality space along a direction corresponding to the mapped orientation from the mapped location in the artificial reality space. The processor 118 may generate image data describing an image of the determined view of the artificial reality space, and transmit the image data to the HWD 150 through the wireless interface 115. The processor 118 may encode the image data describing the image, and can transmit the encoded data to the HWD 150. In some embodiments, the processor 118 generates and provides the image data to the HWD 150 periodically (e.g., every 11 ms or 16 ms).

In some embodiments, the processors 118, 170 may configure or cause the wireless interfaces 115, 165 to toggle, transition, cycle or switch between a sleep mode and a wake up mode. In the wake up mode, the processor 118 may enable the wireless interface 115 and the processor 170 may enable the wireless interface 165, such that the wireless interfaces 115, 165 may exchange data. In the sleep mode, the processor 118 may disable (e.g., implement low power operation in) the wireless interface 115 and the processor 170 may disable the wireless interface 165, such that the wireless interfaces 115, 165 may not consume power or may reduce power consumption. The processors 118, 170 may schedule the wireless interfaces 115, 165 to switch between the sleep mode and the wake up mode periodically every frame time (e.g., 11 ms or 16 ms). For example, the wireless interfaces 115, 165 may operate in the wake up mode for 2 ms of the frame time, and the wireless interfaces 115, 165 may operate in the sleep mode for the remainder (e.g., 9 ms) of the frame time. By disabling the wireless interfaces 115, 165 in the sleep mode, power consumption of the computing device 110 and the HWD 150 can be reduced.

Systems and Methods for Ultra-Wideband Devices

In various embodiments, the devices in the environments described above may operate or otherwise use components which leverage communications in the ultra-wideband (UWB) spectrum. In various embodiments, UWB devices operate in the 3-10 GHz unlicensed spectrum using 500+ MHz channels which may require low power for transmission. For example, the transmit power spectral density (PSD) for some systems may be limited to −41.3 dBm/MHz. On the other hand, UWB may have transmit PSD values in the range of −5 to +5 dBm/MHz range, averaged over 1 ms, with a peak power limit of 0 dBm in a given 50 MHz band. Using simple modulation and spread spectrum, UWB devices may achieve reasonable resistance to Wi-Fi and Bluetooth interference (as well as resistance to interference with other UWB devices located in the environment) for very low data rates (e.g., 10 s to 100 s Kbps) and may have large processing gains. However, for higher data rates (e.g., several Mbps), the processing gains may not be sufficient to overcome co-channel interference from Wi-Fi or Bluetooth. According to the embodiments described herein, the systems and methods described herein may operate in frequency bands that do not overlap with Wi-Fi and Bluetooth, but may have good global availability based on regulatory requirements. Since regulatory requirements make the 7-8 GHz spectrum the most widely available globally (and Wi-Fi is not present in this spectrum), the 7-8 GHz spectrum may operate satisfactory both based on co-channel interference and processing gains.

Figure 3:
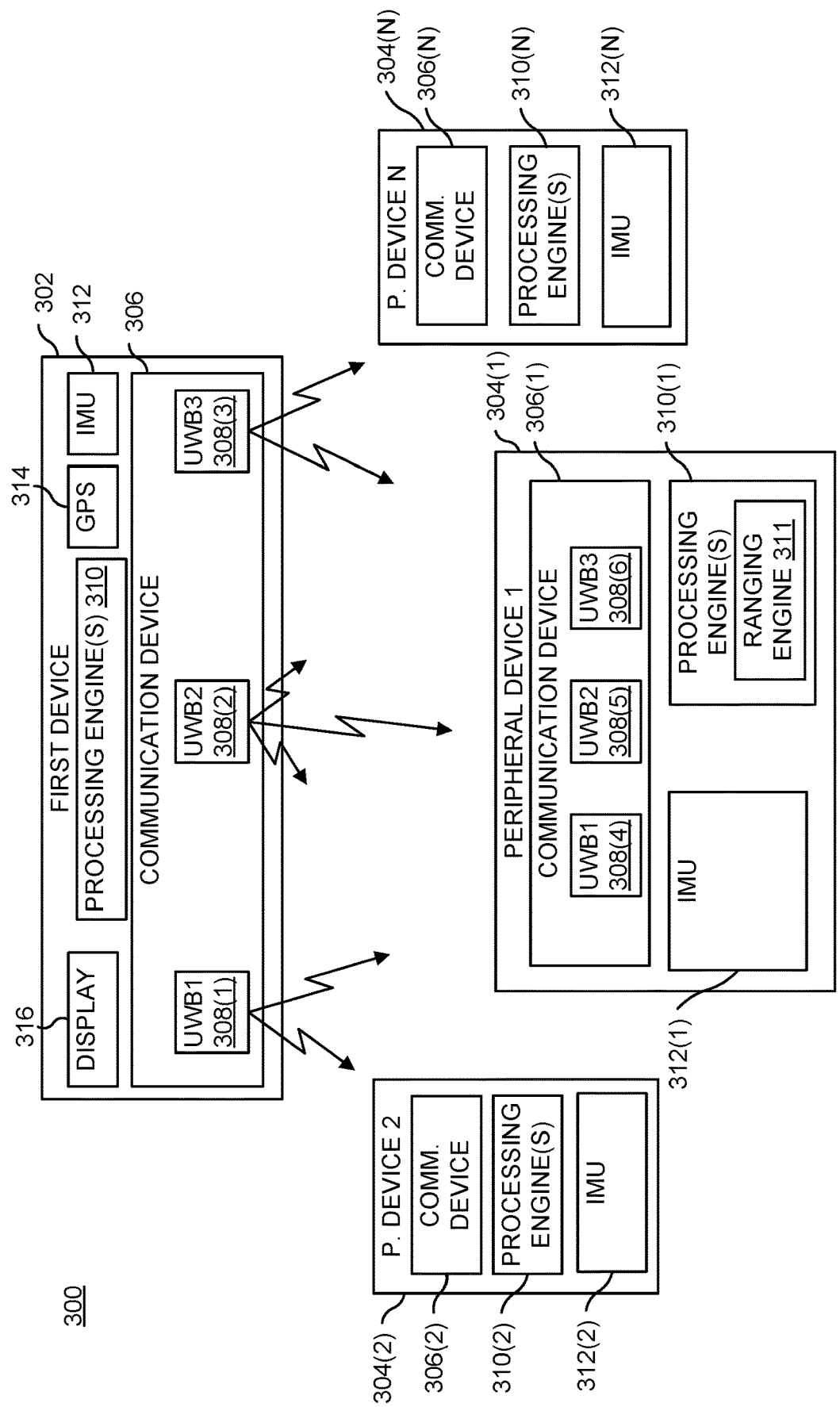
FIG. 3 is a block diagram of an artificial reality environment, according to an example implementation of the present disclosure.

Some implementations of UWB may focus on precision ranging, security, and for low-to-moderate rate data communication. As UWB employs relatively simple modulation, it may be implemented at low cost and low power consumption. In AR/VR applications (or in other applications and use cases), link budget calculations for an AR/VR controller link indicate that the systems and methods described herein may be configured for effective data throughput ranging from to 31 Mbps (e.g., with 31 Mbps being the maximum possible rate in the latest 802.15.4z standard), which may depend on body loss assumptions Referring now to FIG. 3, depicted is a block diagram of an artificial reality environment 300. The artificial reality environment 300 is shown to include a first device 302 and one or more peripheral devices 304(1)-304(N) (also referred to as "peripheral device 304" or "device 304"). The first device 302 and peripheral device(s) 304 may each include a communication device 306 including a plurality of UWB devices 308. A set of UWB devices 308 may be spatially positioned/located (e.g., spaced out) relative to each other on different locations on/in the first device 302 or the peripheral device 304, so as to maximize UWB coverage and/or to enhance/enable specific functionalities. The UWB devices 308 may be or include antennas, sensors, or other devices and components designed or implemented to transmit and receive data or signals in the UWB spectrum (e.g., between 3.1 GHz and 10.6 GHz) and/or using UWB communication protocol. In some embodiments, one or more of the devices 302, 304 may include various processing engines 310. The processing engines 310 may be or include any device, component, machine, or other combination of hardware and software designed or implemented to control the devices 302, 304 based on UWB signals transmitted and/or received by the respective UWB devices 308.

As noted above, the environment 300 may include a first device 302. The first device 302 may be or include a wearable device, such as the HWD 150 described above, a smart watch, AR glasses, or the like. In some embodiments, the first device 302 may include a mobile device (e.g., a smart phone, tablet, console device, or other computing device). The first device 302 may be communicably coupled with various other devices 304 located in the environment 300. For example, the first device 302 may be communicably coupled to one or more of the peripheral devices 304 located in the environment 300. The peripheral devices 304 may be or include the computing device 110 described above, a device similar to the first device 302 (e.g., a HWD 150, a smart watch, mobile device, etc.), an automobile or other vehicle, a beacon transmitting device located in the environment 300, a smart home device (e.g., a smart television, a digital assistant device, a smart speaker, etc.), a smart tag configured for positioning on various devices, etc. In some embodiments, the first device 302 may be associated with a first entity or user and the peripheral devices 304 may be associated with a second entity or user (e.g., a separate member of a household, or a person/entity unrelated to the first entity).

In some embodiments, the first device 302 may be communicably coupled with the peripheral device(s) 304 following a pairing or handshaking process. For example, the first device 302 may be configured to exchange handshake packet(s) with the peripheral device(s) 304, to pair (e.g., establish a specific or dedicated connection or link between) the first device 302 and the peripheral device 304. The handshake packet(s) may be exchanged via the UWB devices 308, or via another wireless link 125 (such as one or more of the wireless links 125 described above). Following pairing, the first device 302 and peripheral device(s) 304 may be configured to transmit, receive, or otherwise exchange UWB data or UWB signals using the respective UWB devices 308 on the first device 302 and/or peripheral device 304. In some embodiments, the first device 302 may be configured to establish a communications link with a peripheral device 304 (e.g., without any device pairing). For example, the first device 302 may be configured to detect, monitor, and/or identify peripheral devices 304 located in the environment using UWB signals received from the peripheral devices 304 within a certain distance of the first device 302, by identifying peripheral devices 304 which are connected to a shared Wi-Fi network (e.g., the same Wi-Fi network to which the first device 302 is connected), etc. In these and other embodiments, the first device 302 may be configured to transmit, send, receive, or otherwise exchange UWB data or signals with the peripheral device 304.

In some embodiments, the first device 302 and peripheral device 304 may be paired following establishing a first connection at a first time instance. Pairing may include storing device identification information such that the first device 302 and peripheral device 304 may subsequently establish a connection at a second time instance with limited to no user intervention. For example, the first device 302 may be paired with the peripheral device 304 by storing or registering device identification information of the peripheral device 304. When the peripheral device 304 is subsequently in a common or shared environment with the first device 302, the peripheral device 304 may broadcast locally its device identification information. The first device 302 may receive the device identification information, determine that the peripheral device 304 is paired with the first device 302 (e.g., based on the device identification information matching the stored/registered device identification information) and automatically establish a connection with the peripheral device 304.

Figure 4:
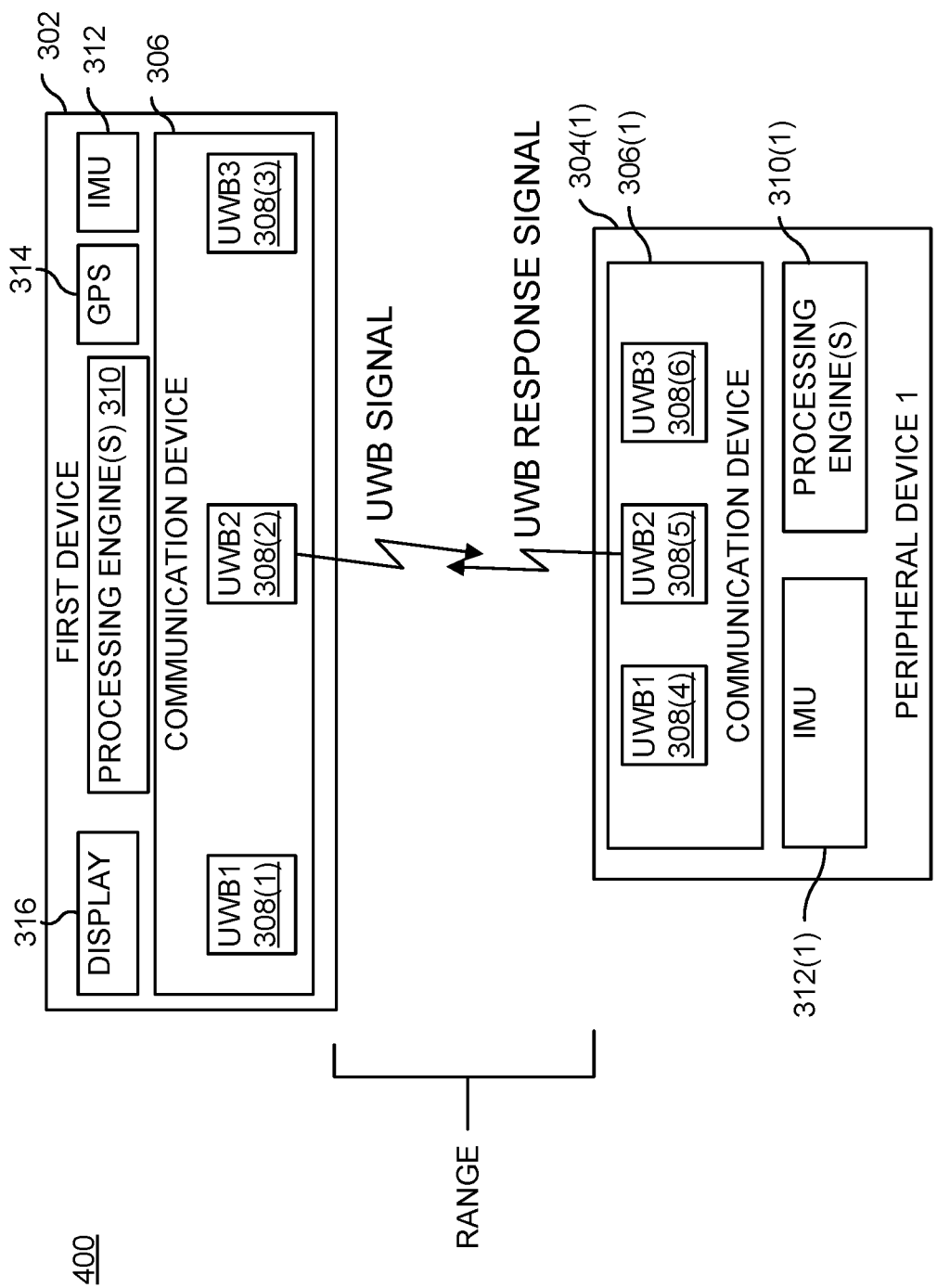
FIG. 4 is a block diagram of another artificial reality environment, according to an example implementation of the present disclosure.

Referring now to FIG. 4, depicted is a block diagram of an environment 400 including the first device 302 and a peripheral device 304. The first device 302 and/or the peripheral device 304 may be configured to determine a range (e.g., a spatial distance, separation) between the devices 302, 304. The first device 302 may be configured to send, broadcast, or otherwise transmit a UWB signal (e.g., a challenge signal). The first device 302 may transmit the UWB signal using one of the UWB devices 308 of the communication device 306 on the first device 302. The UWB device 308 may transmit the UWB signal in the UWB spectrum. The UWB signal may have a high bandwidth (e.g., 500 MHz). As such, the UWB device 308 may be configured to transmit the UWB signal in the UWB spectrum (e.g., between 3.1 GHz and 10.6 GHz) and having a high bandwidth (e.g., 500 MHz). The UWB signal from the first device 302 may be detectable by other devices within a certain range of the first device 302 (e.g., devices having a line of sight (LOS) within 200 m of the first device 302). As such, the UWB signal may be more accurate for detecting range between devices than other types of signals or ranging technology.

The peripheral device 304 may be configured to receive or otherwise detect the UWB signal from the first device 302. The peripheral device 304 may be configured to receive the UWB signal from the first device 302 via one of the UWB devices 308 on the peripheral device 304. The peripheral device 304 may be configured to broadcast, send, or otherwise transmit a UWB response signal responsive to detecting the UWB signal from the first device 302. The peripheral device 304 may be configured to transmit the UWB response signal using one of the UWB devices 308 of the communication device 306 on the peripheral device 304. The UWB response signal may be similar to the UWB signal sent from the first device 302.

The first device 302 may be configured to detect, compute, calculate, or otherwise determine a time of flight (TOF) based on the UWB signal and the UWB response signal. The TOF may be a time or duration between a time in which a signal (e.g., the UWB signal) is transmitted by the first device 302 and a time in which the signal is received by the peripheral device 304. The first device 302 and/or the peripheral device 304 may be configured to determine the TOF based on timestamps corresponding to the UWB signal. For example, the first device 302 and/or peripheral device 304 may be configured to exchange transmit and receive timestamps based on when the first device 302 transmits the UWB signal (a first TX timestamp), when the peripheral device receives the UWB signal (e.g., a first RX timestamp), when the peripheral device sends the UWB response signal (e.g., a second TX timestamp), and when the first device 302 receives the UWB response signal (e.g., a second RX timestamp). The first device 302 and/or the peripheral device 304 may be configured to determine the TOF based on a first time in which the first device 302 sent the UWB signal and a second time in which the first device 302 received the UWB response signal (e.g., from the peripheral device 304), as indicated by first and second TX and RX timestamps identified above. The first device 302 may be configured to determine or calculate the TOF between the first device 302 and the peripheral device 304 based on a difference between the first time and the second time (e.g., divided by two).

In some embodiments, the first device 302 may be configured to determine the range (or distance) between the first device 302 and the peripheral device 304 based on the TOF. For example, the first device 302 may be configured to compute the range or distance between the first device 302 and the peripheral device 304 by multiplying the TOF and the speed of light (e.g., TOF×c). In some embodiments, the peripheral device 304 (or another device in the environment 400) may be configured to compute the range or distance between the first device 302 and peripheral device 304. For example, the first device 302 may be configured to transmit, send, or otherwise provide the TOF to the peripheral device 304 (or other device), and the peripheral device 304 (or other device) may be configured to compute the range between the first device 302 and peripheral device 304 based on the TOF, as described above.

Figure 5:
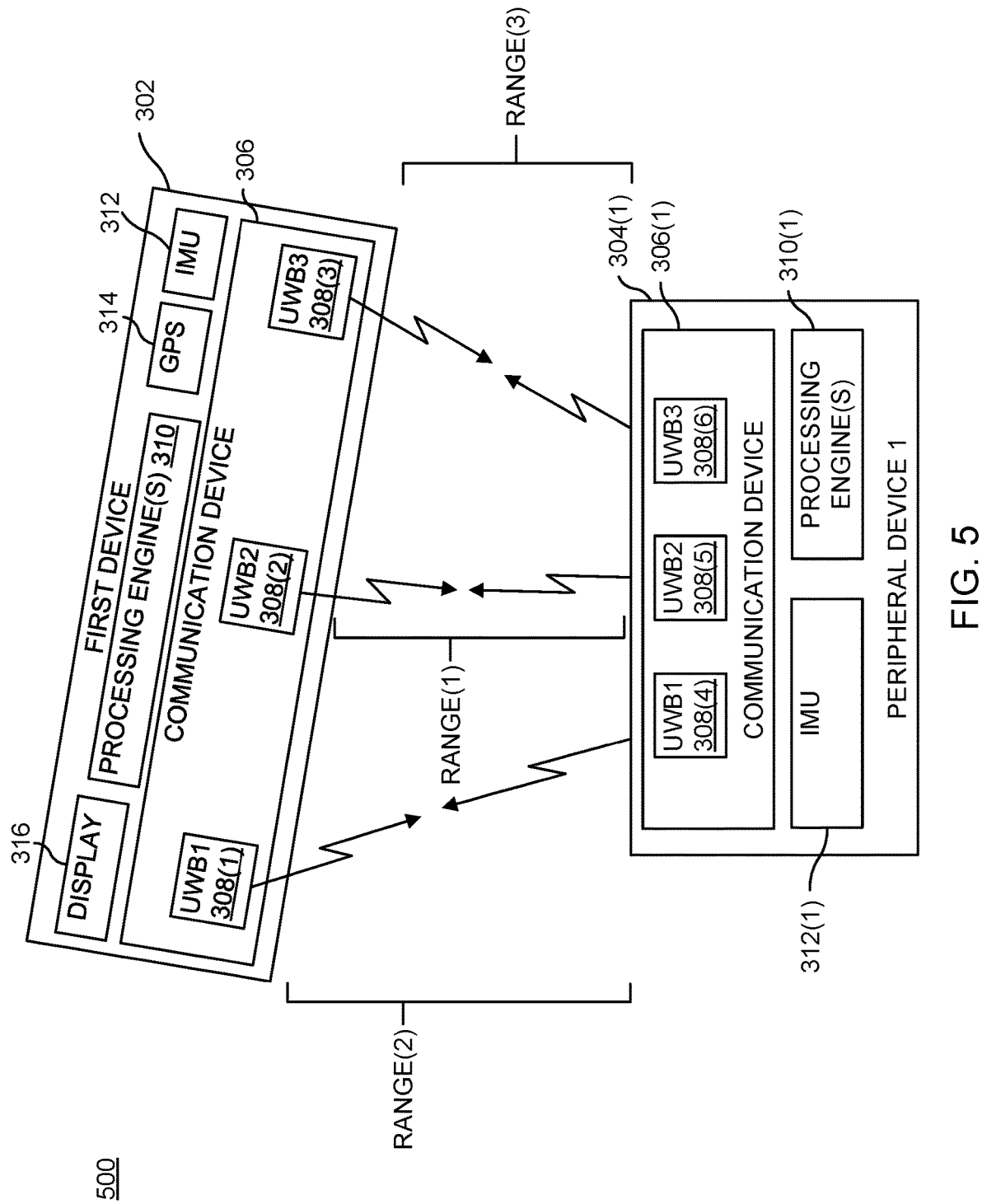
FIG. 5 is a block diagram of another artificial reality environment, according to an example implementation of the present disclosure.

Referring now to FIG. 5, depicted is a block diagram of an environment 500 including the first device 302 and a peripheral device 304. In some embodiments, the first device 302 and/or the peripheral device 304 may be configured to determine a position or pose (e.g., orientation) of the first device 302 relative to the peripheral device 304. The first device 302 and/or the peripheral device 304 may be configured to determine the relative position or orientation in a manner similar to determining the range as described above. For example, the first device 302 and/or the peripheral device 304 may be configured to determine a plurality of ranges (e.g., range(1), range(2), and range(3)) between the respective UWB devices 308 of the first device 302 and the peripheral device 304. In the environment 500 of FIG. 5, the first device 302 is positioned or oriented at an angle relative to the peripheral device 304. The first device 302 may be configured to compute the first range (range(1)) between central UWB devices 308(2), 308(5) of the first and peripheral device 304. The first range may be an absolute range or distance between the devices 302, 304, and may be computed as described above with respect to FIG. 4.

The first device 302 and/or the peripheral device 304 may be configured to compute the second range(2) and third range(3) similar to computing the range(1), In some embodiments, the first device 302 and/or the peripheral device 304 may be configured to determine additional ranges, such as a range between UWB device 308(1) of the first device 302 and UWB device 308(5) of the peripheral device 304, a range between UWB device 308(2) of the first device 302 and UWB device 308(6) of the peripheral device 304, and so forth. While described above as determining a range based on additional UWB signals, it is noted that, in some embodiments, the first device 302 and/or the peripheral device 304 may be configured to determine a phase difference between a UWB signal received at a first UWB device 308 and a second UWB device 308 (i.e., the same UWB signal received at separate UWB devices 308 on the same device 302, 304). The first device 302 and/or the peripheral device 304 may be configured to use each or a subset of the computed ranges (or phase differences) to determine the pose, position, orientation, etc. of the first device 302 relative to the peripheral device 304. For example, the first device and/or the peripheral device 304 may be configured to use one of the ranges relative to the first range(1) (or phase differences) to determine a yaw of the first device 302 relative to the peripheral device 304, another one of the ranges relative to the first range(1) (or phase differences) to determine a pitch of the first device 302 relative to the peripheral device 304, another one of the ranges relative to the first range(1) (or phase differences) to determine a roll of the first device 302 relative to the peripheral device 304, and so forth.

By using the UWB devices 308 at the first device 302 and peripheral devices 304, the range and pose may be determined with greater accuracy than other ranging/wireless link technologies. For example, the range may be determined within a granularity or range of +/−0.1 meters, and the pose/orientation may be determined within a granularity or range of +/−5 degrees.

Referring to FIG. 3-FIG. 5, in some embodiments, the first device 302 may include various sensors and/or sensing systems. For example, the first device 302 may include an inertial measurement unit (IMU) sensor 312, global positioning system (GPS) 314, etc. The sensors and/or sensing systems, such as the IMU sensor 312 and/or GPS 314 may be configured to generate data corresponding to the first device 302. For example, the IMU sensor 312 may be configured to generate data corresponding to an absolute position and/or pose of the first device 302. Similarly, the GPS 314 may be configured to generate data corresponding to an absolute location/position of the first device 302. The data from the IMU sensor 312 and/or GPS 314 may be used in conjunction with the ranging/position data determined via the UWB devices 308 as described above. In some embodiments, the first device 302 may include a display 316. The display 316 may be integrated or otherwise incorporated in the first device 302. In some embodiments, the display 316 may be separate or remote from the first device 302. The display 316 may be configured to display, render, or otherwise provide visual information to a user or wearer of the first device 302, which may be rendered at least in part on the ranging/position data of the first device 302.

One or more of the devices 302, 304 may include various processing engine(s) 310. As noted above, the processing engine(s) 310 may be or include any device, component, machine, or combination of hardware and software designed or implemented to control the devices 302, 304 based on UWB signals transmitted and/or received by the respective UWB devices 308. In some embodiments, the processing engine(s) 310 may be configured to compute or otherwise determine the ranges/positions of the first device 302 relative to the peripheral devices 304 as described above. In some embodiments, the processing engines 310 may be located or embodied on another device in the environment 300-500 (such as at the access point 105 as described above with respect to FIG. 1). As such, the first device 302 and/or peripheral devices 304 may be configured to off-load computation to another device in the environment 300-500 (such as the access point 105). In some embodiments, the processing engines 310 may be configured to perform various functions and computations relating to radio transmissions and scheduling (e.g., via the UWB devices 308 and/or other communication interface components), compute or otherwise determine range and relative position of the devices 302, 304, manage data exchanged between the devices 302, 304, interface with external components (such as hardware components in the environment 300-500, external software or applications, etc.), and the like. Various examples of functions and computations which may be performed by the processing engine(s) 310 are described in greater detail below.

Systems and Methods for Automatic Triggering of Ranging

In one aspect, the present systems and methods may be configured to automatically trigger ranging, device discovery and/or device pairing between devices. The systems and methods described herein may be configured to trigger ranging between devices based on data from an inertial measurement unit (IMU) or other motion sensor(s) on the respective device(s). In the case of device pairing, an associated pair of devices may be preloaded with information that can be used for the device pairing procedure/handshake, to enable/facilitate on-demand seamless and efficient device pairing. Although the scenario for ranging may be discussed below, this is by way of illustration and not intended to be limiting, such that other functions/procedures (e.g., link discovery, device pairing) may be triggered by IMU or other motion data.

Referring now to FIG. 3-FIG. 5, and in some embodiments, the processing engine(s) 310 may include a ranging engine 311. The ranging engine 311 may be or include any device, component, machine, or combination of hardware and software designed or implemented to control, schedule, transmit, receive, process, or otherwise manage data exchanged between devices 302, 304 in the environment 300. As described in greater detail below, the ranging engine 311 may be configured to perform automatic triggering (e.g., initiation or activation) of ranging between devices 302, 304. In some embodiments, the ranging engine 311 may be configured to establish a connection between the first device 302 and peripheral device 304. The ranging engine 311 may be configured to establish the connection as described above with reference to FIG. 3-FIG. 5. For example, the ranging engine 311 of the first device 302 may be configured to perform a handshake protocol with a ranging engine 311 of the peripheral device 304. The data engines 311 may be configured to establish the connection according to the handshake protocol.

In some embodiments, the first device 302 and/or the peripheral device 304 may include an IMU 312. The IMU 312 may include one or more sensors configured to detect, quantify, or otherwise measure movement, orientation and/or inertial characteristics of a body, e.g., upon which the IMU 312 is mounted and/or relative to another body or reference. As such, the IMU 312 of the first device 302 and/or peripheral device 304 may be configured to measure one or more inertial characteristics of the first device 302 and/or the peripheral device 304. It is noted that the IMU 312 may include any type of device or sensor configured to measure, quantify, detect, determine, or otherwise generate motion data (e.g., data of movement, direction, orientation, speed, displacement, acceleration, or change thereof) of the device upon which the IMU 312 is located, mounted, or otherwise provided. The first device 302 may have a wireless link established with the peripheral device 304, which may be established via a BLE pairing or handshake protocol. As described above, the data engine (or other processing engine 310) of the first device 302 and/or the peripheral device 304 may be configured to detect a range or relative distance between the first device 302 and the peripheral device 304.

The IMU 312 may be configured to generate, measure, quantify, detect, or otherwise determine motion data of a respective device. In some embodiments, the IMU 312 may be configured to determine the motion data of the device at various intervals. For example, the IMU 312 may be configured to determine the motion data of the device every 1 ms, 5 ms, 10 ms, etc. The IMU 312 may be configured to transmit, send, or otherwise provide the motion data to the first device 302 and/or the peripheral device 304.

The ranging engine 311 may be configured to receive/access the motion data from the IMU 312. In some embodiments, the first device 302 and/or peripheral device 304 may be configured to establish the connection between the first and peripheral device 302, 304 responsive to receiving the motion data. For example, and as described in greater detail below, where the motion data exceeds a predetermined threshold or otherwise satisfies a threshold criteria/condition, the first and peripheral device 302, 304 may be configured to automatically perform/trigger/initiate one or more functions. The functions may include, for example, establishing a connection between the devices 302, 304, pairing the devices 302, 304, and/or switching to a certain mode of operation of the devices 302, 304.

The first device 302 and/or peripheral device 304 may be configured to perform one or more ranging operations. Each ranging operation may be or include a sequence of operations performed by the respective devices for determining a range (e.g., distance, displacement) between the respective devices. For instance, the sequence of operations may include a first operation in which one device transmits a UWB signal to another device, and a second operation in which the other device receives the UWB signal and transmits a UWB response signal. The ranging operations are described in greater detail above with reference to FIG. 4.

The first device 302 and/or peripheral device 304 may be configured to operate in (and/or switch between) one or more modes of operation such that the first device 302 and/or peripheral device 304 can selectively perform ranging options. For example, the first device 302 and/or the peripheral device 304 may operate in one or more modes of operation, including an inactive ranging mode and an active ranging mode. The first device 302 and/or peripheral device 304 may be configured to switch between the modes based on the motion data from the IMU 312. In some embodiments, in the inactive ranging mode, the first device 302 and/or peripheral device 304 may be configured to selectively perform (e.g., reduce/avoid, or conditionally perform) ranging operations between the first and peripheral devices 302, 304. In some embodiments, in the inactive ranging mode, the first device 302 and/or peripheral device 304 may be configured to forego, omit, or otherwise avoid performing ranging operations between the first and peripheral devices 302, 304. In at least some of these embodiments, when the first device 302 and/or peripheral device 304 are in the inactive ranging mode, the first device 302 and/or peripheral device 304 may reduce power consumption by performing fewer ranging operations than are performed in the active ranging mode. In the active ranging mode, the first device 302 and/or peripheral device 304 may be configured to perform ranging operations at a greater frequency or intervals than in the inactive ranging mode. For example, the first device 302 and/or peripheral device 304 may be configured to perform ranging operations at a predetermined frequency or interval (e.g., once every 1 ms, every 5 ms, every 10 ms, etc.) in one mode, and can increase/reduce the frequency or interval in the other mode. In at least some of these embodiments, the first device 302 and/or peripheral device 304 may be configured to track or otherwise monitor a change in the range (or motion data) between the first and peripheral devices 302, 304 and to perform ranging operations at predetermined reduced frequency or interval in response to the change.

As described briefly above, the ranging engine 311 may be configured to receive sensor data from the IMU 312 of the first device 302 and/or the peripheral device 304. In some embodiments, the ranging engine 311 may be configured to receive sensor data from IMUs 312 of both the first and peripheral device 302, 304. The ranging engine 311 may be configured to use the sensor data from the IMU(s) 312 to determine a velocity vector, relative velocity vector, or displacement vector of the first device 302 and/or peripheral device 304. The velocity vector may be or include a vector which represents a rate of change and direction of a device over time. The relative velocity vector may be or include a vector which represents a rate of change and direction of a device relative to another device over time. The displacement vector may be or include a magnitude of a sum of velocity vectors (or relative velocity vectors) determined for the respective devices over time (e.g., over two measurement periods). The velocity vector, relative velocity vector, and/or displacement vector may define or represent motion of a respective device in the environment 300.

In some embodiments, the ranging engine 311 may be configured to determine a velocity vector (or relative velocity vector or displacement vector) of the first device 302 and/or the peripheral device 304 based on the IMU or sensor data. In some embodiments, the ranging engine 311 may be configured to use ranging operations performed in the active (or inactive) ranging modes to determine the velocity vector, relative velocity vector, and/or displacement vector. For example, the ranging engine 311 may be configured to determine the velocity vector (or relative velocity vector, displacement vector, etc.) based on a change in the range between the devices 302, 304 over two (or more) measurements by the IMU 312 and/or ranging operations performed by the devices 302, 304.

The ranging engine 311 may be configured to maintain, include, or otherwise access one or more threshold criteria. The threshold criteria may be or include a threshold corresponding to (e.g., to trigger) a switch between the inactive ranging mode and the active ranging mode. The threshold may be, for instance, a threshold velocity or relative velocity, a threshold range of velocities, etc. In some embodiments, the threshold may be predetermined (e.g., set by a manufacturer of the first device 302 and/or peripheral device 304). In some embodiments, the threshold may be dynamically set/adjusted/determined. For example, the ranging engine 311 may be configured to determine the threshold as a function of a battery power of the first device 302 and/or peripheral device 304 (e.g., to increase the threshold as the battery power decreases or falls below a threshold battery level). In some embodiments, the threshold may be set by a user of the first device 302 and/or peripheral device 304. In some embodiments, the threshold may be determined or negotiated by the data engines 311 of the first and/or peripheral device 302, 304 during pairing or establishment of the connection.

The ranging engine 311 may be configured to compare the velocity vector (or relative velocity vector) determined based on the IMU or sensor data received from the IMU 312 (or based on ranging operations performed by the devices 302, 304, to a threshold (or level/value, which may be set to, for example, approximately zero velocity or relative velocity). The ranging engine 311 may be configured to compare the velocity vector to the threshold or range to determine whether the velocity vector satisfies the threshold criteria/condition for switching the modes of operation of the first device 302 and/or peripheral device 304. In some embodiments, the threshold criteria to switch from the inactive ranging mode to the active ranging mode may be satisfied where the velocity vector satisfies (e.g., meets/matches and/or exceeds) the threshold or range. In some embodiments, the threshold criteria to may be satisfied where the velocity vector is satisfies the threshold or range for a number of measurement intervals (e.g., the velocity vector is greater than the threshold for two or more consecutive measurements by the IMU 312). In some embodiments, the threshold criteria to switch from the active ranging mode to the inactive ranging mode, is to satisfy (e.g., meet/match or is less than) the threshold or range. In some embodiments, the threshold criteria to may be satisfied where the velocity vector satisfies the threshold or range for a number of measurement intervals (e.g., the velocity vector is less than the threshold for two or more consecutive measurements by the IMU 312).

The ranging engine 311 may be configured to determine to switch between the modes of operation for the first device 302 and peripheral device 304. The ranging engine 311 may be configured to determine to switch between the modes of operation for the first device 302 and/or peripheral device 304 responsive to the motion data indicating motion of the respective device satisfying the threshold criteria. For example, where/when/if the motion data from the IMU 312 indicates motion of the first device 302 which satisfies the threshold criteria for switching from the inactive ranging mode to the active ranging mode, the ranging engine 311 may be configured to automatically switch the first device 302 from the inactive ranging mode to the active ranging mode. Similarly, where/when/if the motion data from the IMU 312 indicates motion of the first device 302 which satisfies the threshold criteria for switching from the active ranging mode to the inactive ranging mode, the ranging engine 311 may be configured to automatically switch the first device 302 from the active ranging mode to the inactive ranging mode. In some embodiments, the ranging engine 311 may transmit a message, trigger, or other data which causes both the first device 302 and peripheral device 304 to switch from the inactive ranging mode to the active ranging mode. For example, the ranging engine 311 of the first device 302 may transmit data to the peripheral device 304 to cause the peripheral device 304 to switch from the inactive ranging mode to the active ranging mode. As another example, the ranging engine 311 of the first device 302 may receive data from the peripheral device 304 to cause the first device 302 to switch from the inactive ranging mode to the active ranging mode. As such, the determination to switch between modes may be triggered by either device 302, 304 in the environment. As described above, the determination to switch between modes may be based on IMU data, ranging operations, etc. performed by the respective devices 302, 304.

In some embodiments, the ranging engine 311 may be configured to automatically trigger ranging between the first device 302 and the peripheral device 304 responsive to the first device 302 and/or peripheral device 304 switching to the active ranging mode. The ranging engine 311 may be configured to perform one or more ranging operations while the first device 302 and/or peripheral device 304 is in the active ranging mode (e.g., during an active ranging phase). The ranging engine 311 may be configured to perform ranging operation(s) at various predetermined intervals (e.g., every 1 ms, 2 ms, 5 ms, 10 ms, etc.).

In some embodiments, the ranging engine 311 may be configured to determine an orientation of the first device 302 relative to the peripheral device 304, based on ranging operations performed during the active ranging phase. For example, and as described above with reference to FIG. 5, the ranging engine 311 may be configured to determine the orientation based on two or more ranging operations (e.g., a ranging operations between respective UWB devices 308, changes of range in a ranging operation between two or more UWB devices 308, etc.).

The ranging engine 311 may be configured to perform ranging operations within/during (or while in) the active ranging phase until the IMU 312 generates data indicating motion which satisfies a threshold criteria for switching from the active ranging mode to the inactive ranging mode. Once the data engine receives sensor data from the IMU 312 that satisfies the threshold criteria for switching from the active ranging mode to the inactive ranging mode, the ranging engine 311 may be configured to switch the device 302, 304 to the inactive ranging mode. As described above, the device 302, 304 may be configured to perform operations other than ranging operations, in an inactive ranging phase (e.g., when the device 302, 304 is in the inactive ranging mode).

Such embodiments may increase efficiency of the first device 302 and/or peripheral device 304 by automatically triggering UWB-based ranging based on IMU data, as well as down-sampling (e.g., reducing the number/frequency of) ranging determinations by the UWB devices based on the IMU data. Correspondingly, the overall power consumption by the first device 302 and/or the peripheral device 304 may be decreased relative to devices which perform ranging at various recurring intervals, regardless of IMU data.

Figure 6:
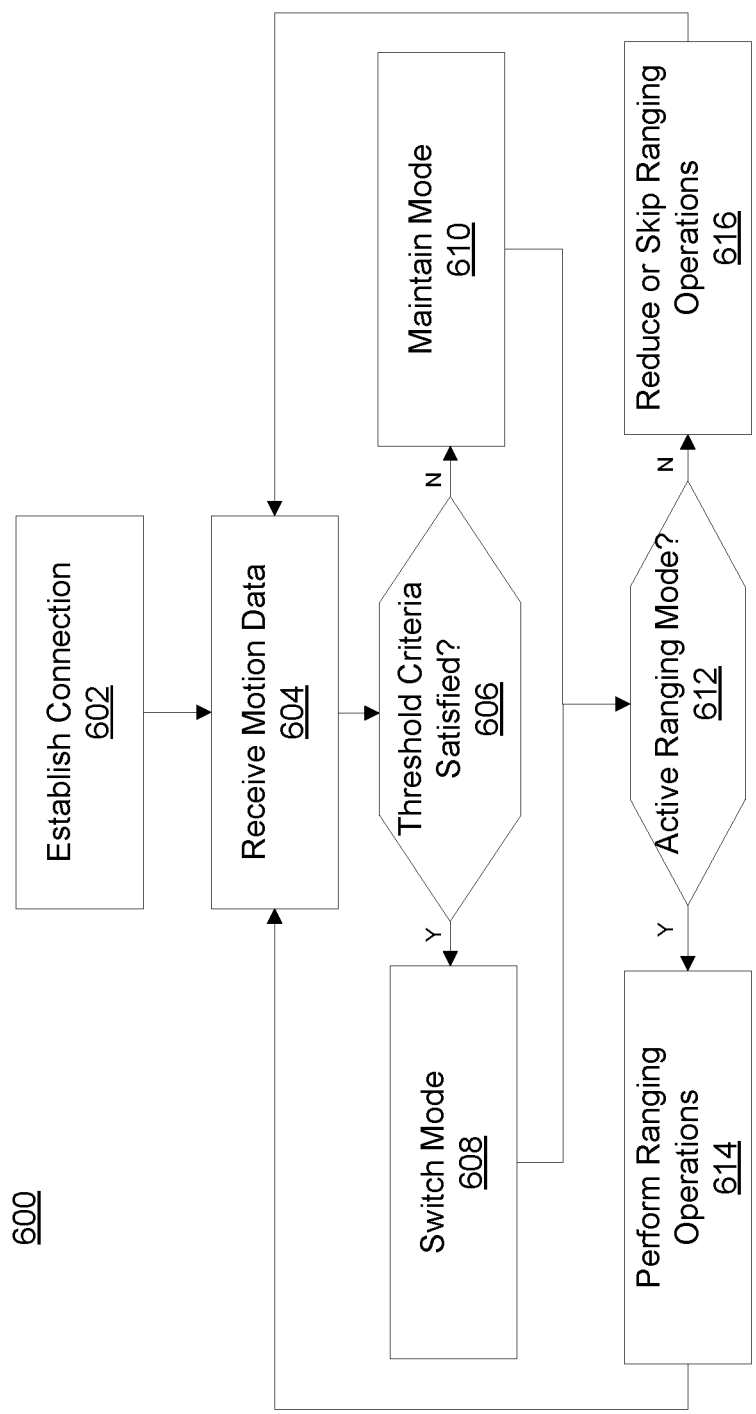
FIG. 6 is a flowchart showing a method of automatic triggering of ranging, according to an example implementation of the present disclosure.

Referring now to FIG. 6, depicted is a flowchart showing an example method 600 of automatic triggering of ranging, according to an illustrative embodiment. The method 600 may be performed by one or more of the devices 302, 304 described above with reference to FIG. 3-FIG. 5. As a brief overview, at step 602, a device establishes a connection. At step 604, the device receives motion data. At step 606, the device determines whether a threshold criteria is satisfied. If yes, the method proceeds to step 608 where the device switches modes. On the other hand, where a threshold criteria is not satisfied, the method proceeds to step 610 where the device maintains the current mode. At step 612, the device determines whether a current mode is an active ranging mode. If yes, the method proceeds to step 614 where the device performs ranging operations. On the other hand, where the device is not currently in an active ranging mode, the method proceeds to step 616 where the device reduces or skips ranging operations. Following steps 614 and 616, the method 600 may proceed back to step 604, and loop between steps 604-616.

At step 602, a device establishes a connection. In some embodiments, the device may establish a connection with a second device. The devices may both include respective UWB devices or antennas. The devices may, in some embodiments, establish a connection responsive to receiving motion data (e.g., following step 604) as described below. As such, in some embodiments, the devices may establish a connection following the devices being moved by respective users of the device. In some embodiments, the devices may establish a connection by performing a handshake protocol by the devices. The devices may establish the connection according to the handshake protocol. In some embodiments, the devices may establish the connection and can pair with one another responsive to receiving the motion data. In other words, pairing of the devices may be performed responsive to the motion data. As such, in some embodiments, step 602 may be preceded by step 604.

At step 604, the device receives motion data. In some embodiments, the device may receive the motion data of the device from one or more motion sensors of the device. The motion sensor may include, for example, an inertial measurement unit (IMU) mounted or otherwise provided on the device. The motion sensor may include any other form or type of sensor for generating, sensing, quantifying, or otherwise determining motion data corresponding to motion of a device upon which the sensor is mounted. In some embodiments, the device may receive the motion data from the motion sensor during an inactive ranging phase (e.g., when the device is in an inactive ranging mode). In some embodiments, the device may receive the motion data from the motion sensor during an active ranging phase (e.g., when the device is in an active ranging mode).

In some embodiments, the motion data includes a velocity vector of the device. The velocity vector may be or include a rate of change of a position of the device accompanied with a directional component (e.g., indicating a direction of the change in the position of the device). For example, the motion sensor may track/monitor/measure a change in motion over two or more measurement instances. The motion sensor may use the change in motion to compute or otherwise determine the velocity vector for the device. In some embodiments, the motion data may include relative motion data. For instance, the device may receive motion data from motion sensors of the device and the second device. The device may determine the relative motion data based on a comparison of/between motion data of the devices in the environment. For example, where both devices are moving in harmony (e.g., in a same formation, direction, speed), both motion sensors may generate motion data indicating motion, however since both devices are moving in harmony, the relative motion may be substantially zero.

At step 606, the device determines whether a threshold criteria is satisfied. In some embodiments, the device may determine to switch from the inactive ranging phase to an active ranging phase responsive to the motion data indicating motion of the first device satisfying a threshold criteria. In some embodiments, the device may determine to switch from the active ranging mode to the inactive ranging mode responsive to the motion data indicating motion of the first device satisfying a threshold criteria. As such, the device may maintain (e.g., stored or be configured with) threshold criteria for switching from the inactive ranging phase to the active ranging phase, and threshold criteria for switching from the active ranging phase to the inactive ranging phase. In some embodiments, the threshold criteria may be or include the motion data indicating motion which satisfies a threshold for switching modes (e.g., motion greater than a threshold of approximately zero for switching from the inactive ranging mode to the active ranging mode, motion equal to or less than a threshold of between approximately zero and zero for switching from the active ranging mode to the inactive ranging mode, etc.).

If at step 606, the device determines that the threshold criteria is satisfied, the method 600 proceeds to step 608 where the device switches modes. Specifically, the device may determine, at step 606 to switch from an inactive ranging mode (e.g., during which the device is in an inactive ranging phase) to an active ranging mode (during which the device is in an active ranging phase). The device may determine to switch from the inactive to the active ranging mode based on the motion data received at step 604. Similarly, the device may determine, at step 606 to switch from an inactive ranging mode (e.g., during which the device is in an inactive ranging phase) to an active ranging mode (during which the device is in an active ranging phase). The device may determine to switch from the inactive to the active ranging mode based on the motion data received at step 604. Where/if a threshold criteria is not satisfied, the method proceeds to step 610 where the device maintains the current mode.

At step 612, the device determines whether a current mode of the device is an active ranging mode. For example, the device may determine whether the current mode of the device is the active ranging mode following switching to the active ranging mode from the inactive ranging mode (e.g., at step 608), or following maintaining the current mode (e.g., at step 610). If the device determines that the current mode of operation of the device is the active ranging mode, the method 600 proceeds to step 614.

At step 614, the device may perform one or more ranging operations. The device may perform one or more ranging operations between the device and the second device using the UWB antennas of the respective devices. The device may perform the one or more ranging operations during an active ranging phase (e.g., when the device is in the active ranging mode). In some embodiments, performing ranging operations may include sending a ranging frame, a UWB signal, or the like from the device to the second device. In some embodiments, performing ranging operations may include performing a measurement or determination of a range (e.g., distance, displacement, separation) based on a ranging frame. In some embodiments, performing the one or more ranging operations may include a sequence of operations (e.g., sending a ranging frame to a second device, receiving a response from the second device, and determining a range based on the ranging frame and/or the response). The device may perform the one or more ranging operations responsive to being in the active ranging mode (e.g., switching to the active ranging mode or otherwise switching to the active ranging phase).

In some embodiments, the device may determine an orientation of the device relative to the second device. The device may determine the orientation of the device relative to the second device based on a number of ranging operations between the respective devices within the ranging phase. For instance, the device may determine the orientation of the device based on two or more ranging operations performed during the active ranging phase. The device may determine the orientation based on a relative range determined from the two or more ranging operations. The device may track, determine, or otherwise monitor the orientation of the device based on changes in the relative range over time during the active ranging phase.

On the other hand, where the device is not currently in an active ranging mode, the method can proceed to step 616 where the device reduces, skips, or otherwise performs limited/fewer to no ranging operations. For instance, the device may perform one or more ranging operations in the inactive ranging mode at a reduced frequency relative to ranging operations in the active ranging mode. For example, the device may perform ranging operations in the active ranging mode every 5 ms, and the device may perform ranging operations in the inactive ranging mode every 1 s. In some embodiments, the device may forego, skip, or otherwise avoid performing second ranging operations in the inactive ranging phase. In other words, when the device is in the inactive ranging mode, the device may not perform any ranging operations.

Following steps 614 and 616, the method 600 may proceed back to step 604, where the device receives subsequent motion data. The device may iteratively loop between steps 604 through steps 614 and 616. For instance, at a subsequent point of time where the device is in the active ranging mode and performing ranging operations in the active ranging phase, the device may receive subsequent motion data. The device may then determine that the subsequent motion data does not satisfy the threshold criteria for being in the active ranging mode. On the other hand, the subsequent motion data may satisfy a threshold criteria for switching from the active ranging mode to the inactive ranging mode. The device may determine to switch from the active ranging phase to the inactive ranging phase responsive to the motion data indicating motion of the first device not satisfying the threshold criteria (for staying in the active ranging phase). The device may then switch modes (e.g., at step 608). In this example, the device may switch to the inactive ranging mode. The device may then determine (e.g., at step 612) that the device is not in the active ranging mode, and proceed to step 614 where the device performs limited to no ranging operations and loop back to step 604.

Figure 7:
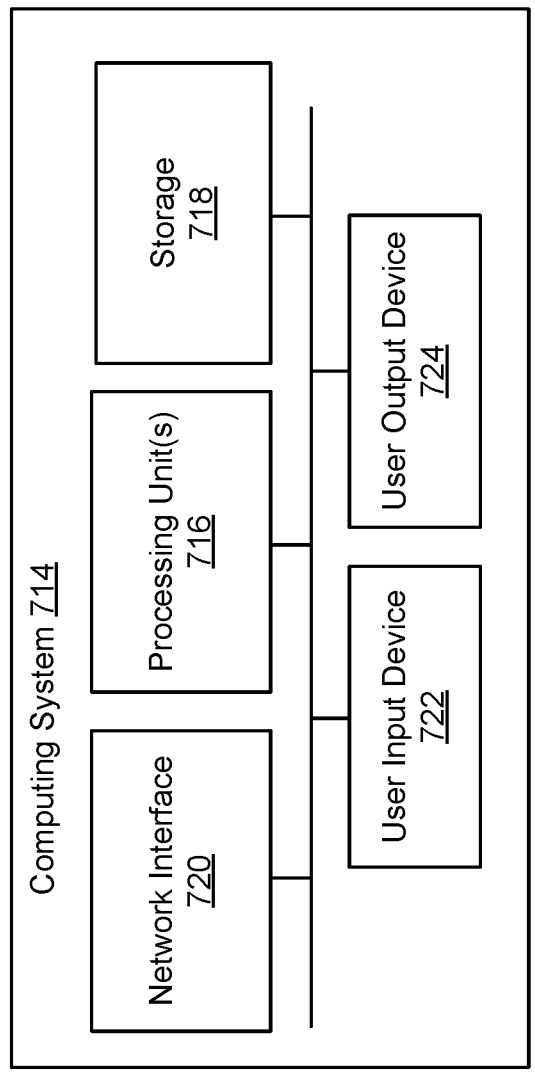
FIG. 7 is a block diagram of a computing environment according to an example implementation of the present disclosure.

Various operations described herein can be implemented on computer systems. FIG. 7 shows a block diagram of a representative computing system 714 usable to implement the present disclosure. In some embodiments, the computing device 110, the HWD 150, devices 302, 304, or each of the components of FIG. 1-5 are implemented by or may otherwise include one or more components of the computing system 714. Computing system 714 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 714 can be implemented to provide VR, AR, MR experience. In some embodiments, the computing system 714 can include conventional computer components such as processors 716, storage device 718, network interface 720, user input device 722, and user output device 724.

Network interface 720 can provide a connection to a wide area network (e.g., the Internet) to which WAN interface of a remote server system is also connected. Network interface 720 can include a wired interface (e.g., Ethernet) and/or a wireless interface implementing various RF data communication standards such as Wi-Fi, Bluetooth, UWB, or cellular data network standards (e.g., 3G, 4G, 5G, 60 GHz, LTE, etc.).

User input device 722 can include any device (or devices) via which a user can provide signals to computing system 714; computing system 714 can interpret the signals as indicative of particular user requests or information. User input device 722 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 724 can include any device via which computing system 714 can provide information to a user. For example, user output device 724 can include a display to display images generated by or delivered to computing system 714. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 724 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 716 can provide various functionality for computing system 714, including any of the functionality described herein as being performed by a server or client, or other functionality associated with message management services.

It will be appreciated that computing system 714 is illustrative and that variations and modifications are possible. Computer systems used in connection with the present disclosure can have other capabilities not specifically described here. Further, while computing system 714 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims.

Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   establishing, by a first device comprising a first ultra-wideband (UWB) antenna, a connection with a second device having a second UWB antenna;
   receiving, by the first device from one or more motion sensors of the first device, motion data of the first device during an inactive ranging mode;
   determining, by the first device, to switch from the inactive ranging mode to an active ranging mode responsive to the motion data indicating motion of the first device satisfying a threshold criteria; and
   performing, by the first device, a first ranging operation between the first device and the second device using the first UWB antenna of the first device and the second UWB antenna of the second device, responsive to switching from the inactive ranging mode to the active ranging mode.

2. The method of claim 1, wherein the motion data comprises a velocity vector of the first device and wherein determining to switch from the inactive ranging mode to the active ranging mode comprises determining, by the first device, to switch from the inactive ranging mode to the active ranging mode responsive to the velocity vector being greater than or equal to the threshold criteria.

3. The method of claim 1, further comprising, responsive to performing the first ranging operation:
   receiving, by the first device from the one or more motion sensors, second motion data during the active ranging mode;
   determining, by the first device, to switch from the active ranging mode to the inactive ranging mode responsive to the motion data indicating motion of the first device not satisfying the threshold criteria; and
   switching, by the first device responsive to the determination, from the active ranging mode to the inactive ranging mode.

4. The method of claim 3, further comprising performing, by the first device, one or more second ranging operations at a reduced frequency of ranging operations in the inactive ranging mode relative to a frequency of ranging operations performed in the active ranging mode.

5. The method of claim 3, wherein switching from the active ranging mode to the inactive ranging mode comprises forgoing, by the first device, any ranging operations in the inactive ranging mode.

6. The method of claim 1, wherein establishing the connection comprises:
   performing, by the first device, a handshake protocol with the second device; and
   establishing, by the first device, the connection according to the handshake protocol.

7. The method of claim 1, further comprising:
   pairing, by the first device, with the second device responsive to receiving the motion data.

8. The method of claim 1, further comprising:
   determining, by the first device, an orientation of the first device relative to the second device, based on one or more second ranging operations between the first UWB antenna of the first device and the second UWB antenna of the second device, responsive to establishing the connection, wherein the one or more second ranging operations are prior to the one or more first ranging operations.

9. The method of claim 1, wherein receiving the motion data comprises receiving, by the first device, motion data of the first device relative to motion data of the second device during the inactive ranging mode.

10. A device comprising:
a first ultra-wideband (UWB) antenna; and
one or more processors configured to:
   establish a connection with a second device having a second UWB antenna;
   receive, from one or more motion sensors of the first device, motion data of the first device during an inactive ranging mode;
   determine to switch from the inactive ranging mode to an active ranging mode responsive to the motion data indicating motion of the first device satisfying a threshold criteria; and
   perform a first ranging operation between the first device and the second device using the first UWB antenna of the first device and the second UWB antenna of the second device, responsive to switching from the inactive ranging mode to the active ranging mode.

11. The device of claim 10, wherein the motion data comprises a velocity vector of the first device and wherein determining to switch from the inactive ranging mode to the active ranging mode is responsive to the velocity vector being greater than or equal to the threshold criteria.

12. The device of claim 10, wherein the one or more processors are further configured to, responsive to performing the first ranging operation:
   receive, from the one or more motion sensors, second motion data during the active ranging mode;
   determine to switch from the active ranging phase to the inactive ranging mode responsive to the motion data indicating motion of the first device not satisfying the threshold criteria; and
   switch, responsive to the determination, from the active ranging mode to the inactive ranging mode.

13. The device of claim 12, wherein the one or more processors are further configured to perform one or more second ranging operations at a reduced frequency in the inactive ranging mode relative to a frequency of ranging operations performed in the active ranging mode.

14. The device of claim 12, wherein the one or more processors are further configured to forego any ranging operations in the inactive UWB mode.

15. The device of claim 10, wherein to establish the connection, the one or more processors are configured to:
   perform a handshake protocol with the second device; and
   establish the connection according to the handshake protocol.

16. The device of claim 10, wherein the one or more processors are further configured to:
   pair with the second device responsive to receiving the motion data.

17. The device of claim 10, wherein the one or more processors are further configured to:
   determine an orientation of the first device relative to the second device, based on one or more second ranging operations between the first UWB antenna of the first device and the second UWB antenna of the second device, responsive to establishing the connection, wherein the one or more second ranging operations are prior to the one or more first ranging operations.

18. The device of claim 10, wherein the one or more processors are further configured to receive the motion data of the first device relative to motion data of the second device during the inactive ranging mode.

19. A non-transitory computer readable medium storing instructions that, when executed by one or more processors, cause the one or more processors to:
   establish a connection between a first device comprising a first ultra-wideband (UWB) antenna and a second device having a second UWB antenna;
   receive from one or more motion sensors of the first device, motion data of the first device during an inactive ranging mode;
   determine to switch from the inactive ranging mode to an active ranging mode responsive to the motion data indicating motion of the first device satisfying a threshold criteria; and
   perform a first ranging operation between the first device and the second device using the first UWB antenna of the first device and the second UWB antenna of the second device, responsive to switching from the inactive ranging mode to the active ranging mode.

20. The non-transitory computer readable medium of claim 19, wherein the instructions further cause the one or more processors to:
   responsive to performing the first ranging operation:
      receive, from the one or more motion sensors, second motion data during the active ranging mode;
      determine to switch from the active ranging phase to the inactive ranging mode responsive to the motion data indicating motion of the first device not satisfying the threshold criteria; and
      switch, responsive to the determination, from the active ranging mode to the inactive ranging mode.

* * * * *